United States Patent
Naito

(10) Patent No.: US 7,778,942 B2
(45) Date of Patent: Aug. 17, 2010

(54) APPARATUS FOR SUPPORTING SALES OF PRODUCT

(75) Inventor: Hirohisa Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 11/889,566

(22) Filed: Aug. 14, 2007

(65) Prior Publication Data

US 2007/0288332 A1  Dec. 13, 2007

Related U.S. Application Data

(63) Continuation of application No. PCT/JP2005/002164, filed on Feb. 14, 2005.

(51) Int. Cl.
*G06Q 90/00* (2006.01)
*G06Q 99/00* (2006.01)
*G03B 21/26* (2006.01)
*G09B 25/00* (2006.01)

(52) U.S. Cl. .......................... 705/500; 705/27; 353/28; 434/371

(58) Field of Classification Search .................. 705/26, 705/27, 500; 353/28, 74; 434/371
See application file for complete search history.

(56) References Cited

U.S. PATENT DOCUMENTS

| | | | |
|---|---|---|---|
| 3,507,570 A | | 4/1970 | Bourdier et al. |
| 3,729,839 A | * | 5/1973 | Bourdier ............... 434/371 |
| 4,902,117 A | * | 2/1990 | Papp .................. 359/629 |
| 5,604,923 A | * | 2/1997 | Wilkus ................. 455/67.7 |
| 5,816,550 A | * | 10/1998 | Watanabe et al. ...... 248/222.11 |
| 6,043,746 A | * | 3/2000 | Sorrells ................ 340/572.7 |
| 6,055,414 A | * | 4/2000 | Javitt .................. 455/67.13 |
| 6,439,345 B1 | * | 8/2002 | Recktenwald et al. ..... 186/55 |
| 6,522,311 B1 | | 2/2003 | Kadowaki et al. |
| 7,062,454 B1 | * | 6/2006 | Giannini et al. ........... 705/27 |
| 7,152,040 B1 | * | 12/2006 | Hawthorne et al. ........ 705/16 |
| 7,353,192 B1 | * | 4/2008 | Ellis et al. .............. 705/27 |
| 7,433,831 B2 | * | 10/2008 | Sweeney ............... 705/20 |
| 7,500,755 B2 | * | 3/2009 | Ishizaki et al. ........... 353/28 |
| 2003/0078895 A1 | * | 4/2003 | MacKay ................ 705/64 |

FOREIGN PATENT DOCUMENTS

| | | |
|---|---|---|
| JP | 50-3945 | 2/1975 |
| JP | 11-164291 | 6/1999 |
| JP | 2002-133219 | 5/2002 |
| JP | 2003-5617 | 1/2003 |
| JP | 2003-141408 | 5/2003 |

(Continued)

OTHER PUBLICATIONS

Feinberg, S., "Combating the What Shop Did I Just Visit Syndrome," WWD, vol. 148, p. 132, Aug. 14, 1984.*

(Continued)

*Primary Examiner*—Nicholas D Rosen
(74) *Attorney, Agent, or Firm*—Staas & Halsey LLP

(57) ABSTRACT

A transmissive display unit that displays thereon product information on a product displayed in a showcase unit. A control unit controls a display of the product information on the transmissive display unit and a sales processing of the product, with an interactive function. A memory unit stores therein the product information. An operating unit inputs instruction information to the control unit.

11 Claims, 18 Drawing Sheets

FOREIGN PATENT DOCUMENTS

| | | |
|---|---|---|
| JP | 2004-118269 | 4/2004 |
| JP | 2004-295487 | 10/2004 |
| WO | WO-9318499 A1 * | 9/1993 |

OTHER PUBLICATIONS

Cork, R., "Mirror, Mirror, of fthe Wall; Arts; Visual Arts; Exhibition," Times of London, Aug. 29, 2001.*

Wilson, M., "Prada's Got a Brand-New Bag," Chain Store Age, vol. 78, No. 2, p. 100, Feb. 2002.*

International Search Report and Written Opinion dated May 31, 2005 in PCT/JP2005/002164.

Japanese Office Action mailed Nov. 4, 2009 in corresponding Japanese Patent Application 2007-502528.

* cited by examiner

US 7,778,942 B2

APPARATUS FOR SUPPORTING SALES OF PRODUCT

CROSS REFERENCE TO RELATED APPLICATION

This is a continuing application, filed under 35 U.S.C. §111(a), of PCT/JP2005/002164, filed Feb. 14, 2005, the contents of which are incorporated herein by reference.

BACKGROUND OF THE INVENTION

1. Field of the Invention

The present invention relates to a technology for supporting sales of a product in an unmanned manner.

2. Description of the Related Art

Recently, an Internet-based mail order (an Internet shopping) has been increasingly used for buying and selling a product, instead of a real shopping in a real shop. In the Internet shopping, a system for buying and selling is employed in which a customer selects a product in a virtual shop on the Internet, adds a selected product to a virtual shopping cart, instructs a shipping of the product, and makes a payment by a bank or with a credit card. The Internet shopping is increasingly used by a number of customers because the Internet shopping is advantageous for the customer in that the customer can purchase a product 24 hours a day without going to a shop in a distant place.

However, in the Internet shopping, it is cumbersome for the customer to find a desired product if the desired product is listed in a deeper level of a page hierarchy in a site of an online shop. In addition, it is difficult for a seller to appeal a special feature of a product to the customer. Therefore, the Internet shopping is disadvantageous compared to the real shopping in that the customer cannot look around the shop to find out a desired product and it is difficult for a seller to appeal a product to the customer. Furthermore, because a screen size for the Internet shopping is limited, it is difficult to view a product in a full scale and to feel a real texture of the product.

The biggest difference between the Internet shopping and the real shopping is that whether the customer can find out a most suitable product from among alternative products based on a look of real products. Furthermore, as described above, because the screen size is limited in the Internet shopping, it is difficult to view a product in a full scale, to feel a real texture of the product, and to determine whether the product matches the customer. Therefore, the Internet shopping is not suitable for a type of purchase in which the customer tries to find a desired product by checking a real texture or by determining a matching size.

Although a bending machine can be another system for selling a product other than the real shopping, a payment process is exclusively automated and there is no other means for checking a product from various aspects, for checking other variations of the product, and for checking whether the product matches other products or whether the product is suitable for the customer. Therefore, the bending machine is still not suitable for finding out a desired product for a purchase.

A different type of system for selling a product is disclosed in Japanese Patent Application Laid-Open No. 2004-118269, in which a product is displayed in a showcase or on a screen, like for the product displayed in a real shop, so that a customer can purchase or reserve a product by a portable terminal.

However, there is a problem in the conventional technologies that it is difficult to provide the above service to general consumers because product information cannot be obtained if the consumers do not have a portable terminal device. Furthermore, it is still difficult to provide a customer with the means for checking a product from various aspects, for checking other products, and for checking whether the product matches other products or whether the product is suitable for the customer.

On the other hand, there is a problem in the real shopping that a customer cannot purchase a product when the shop is closed, even if the customer can view a showcase of the shop and wants to purchase the product. There is another problem that the customer still cannot purchase a product if a staff of the shop is too busy to assist the customer, even when the shop is open. At this state, the customer and the shop unwillingly lose a sales opportunity.

SUMMARY OF THE INVENTION

It is an object of the present invention to at least partially solve the problems in the conventional technology.

An apparatus for supporting sales of a product, according to one aspect of the present invention, includes a showcase unit for displaying the product; a transmissive display unit that displays thereon product information on the product displayed in the showcase unit; a control unit that controls a display of the product information on the transmissive display unit and a sales processing of the product, with an interactive function; a memory unit that stores therein the product information; and an operating unit for inputting instruction information to the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments and various modifications can be applicable without departing from the sprits and scope of the present invention.

Figure 1:
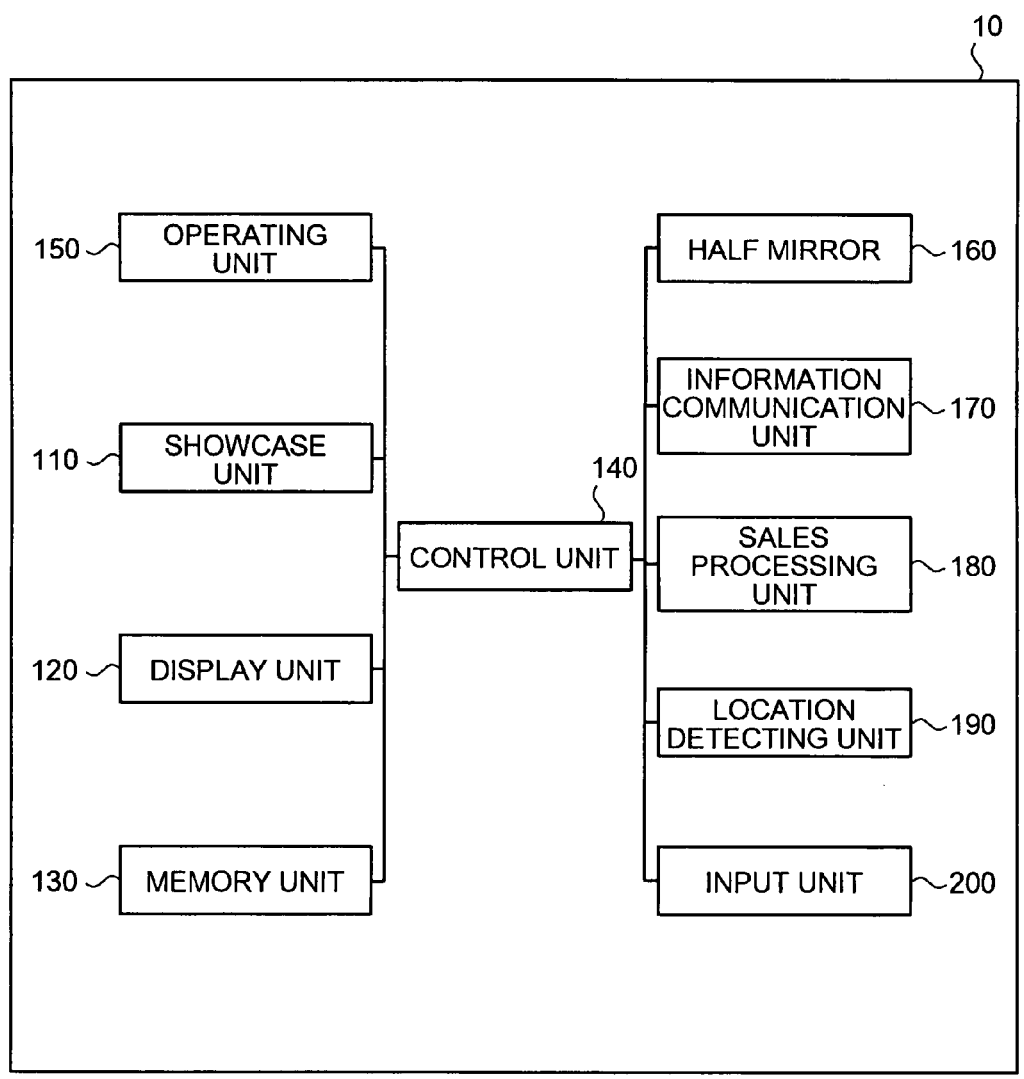
FIG. 1 is a block diagram of a sales supporting apparatus for clothes according to an embodiment of the present invention.
Figure 2:
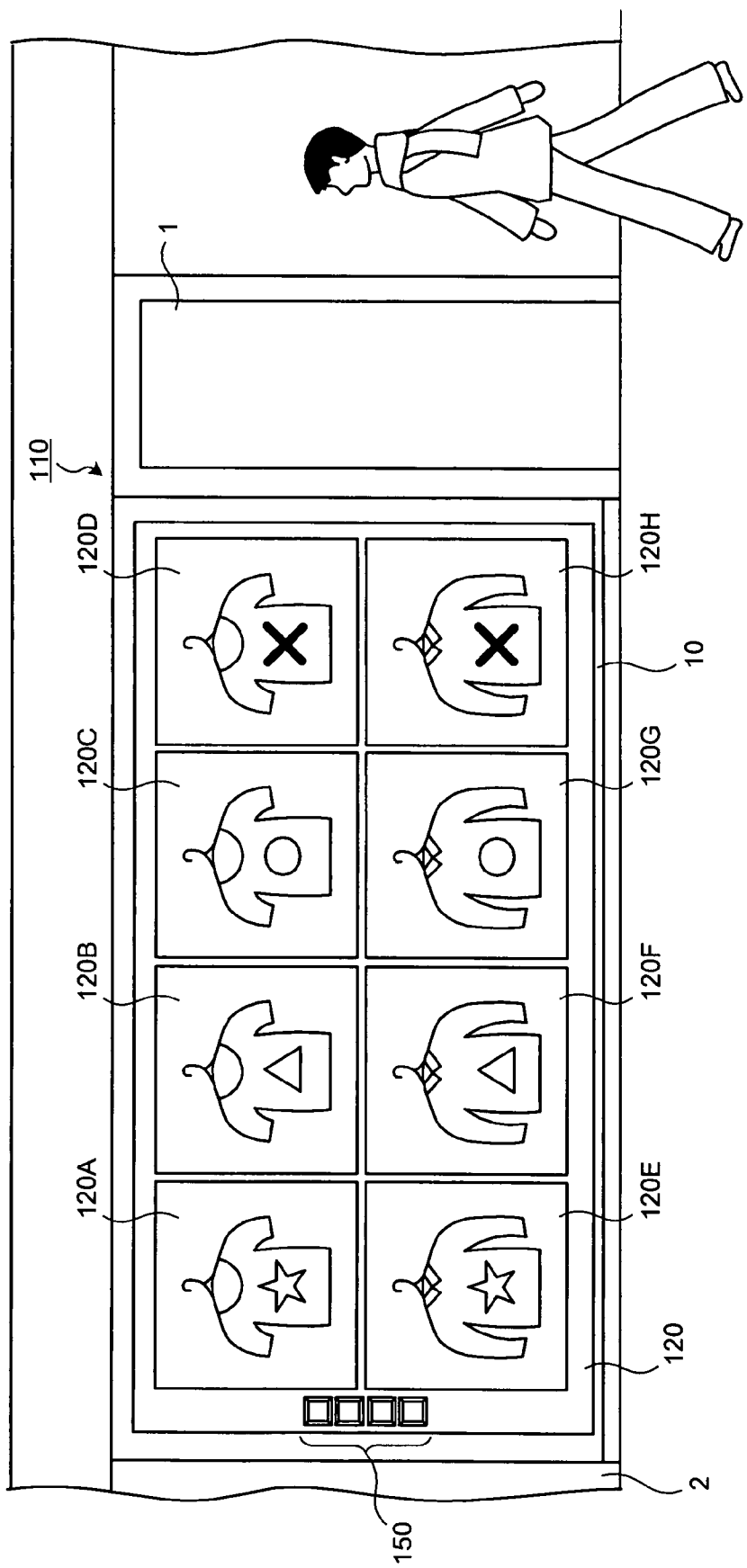
FIG. 2 is a schematic for explaining a situation where the sales supporting apparatus shown in FIG. 1 is installed in an area between an entrance and an exterior wall of a shop according to the embodiment.
Figure 3:
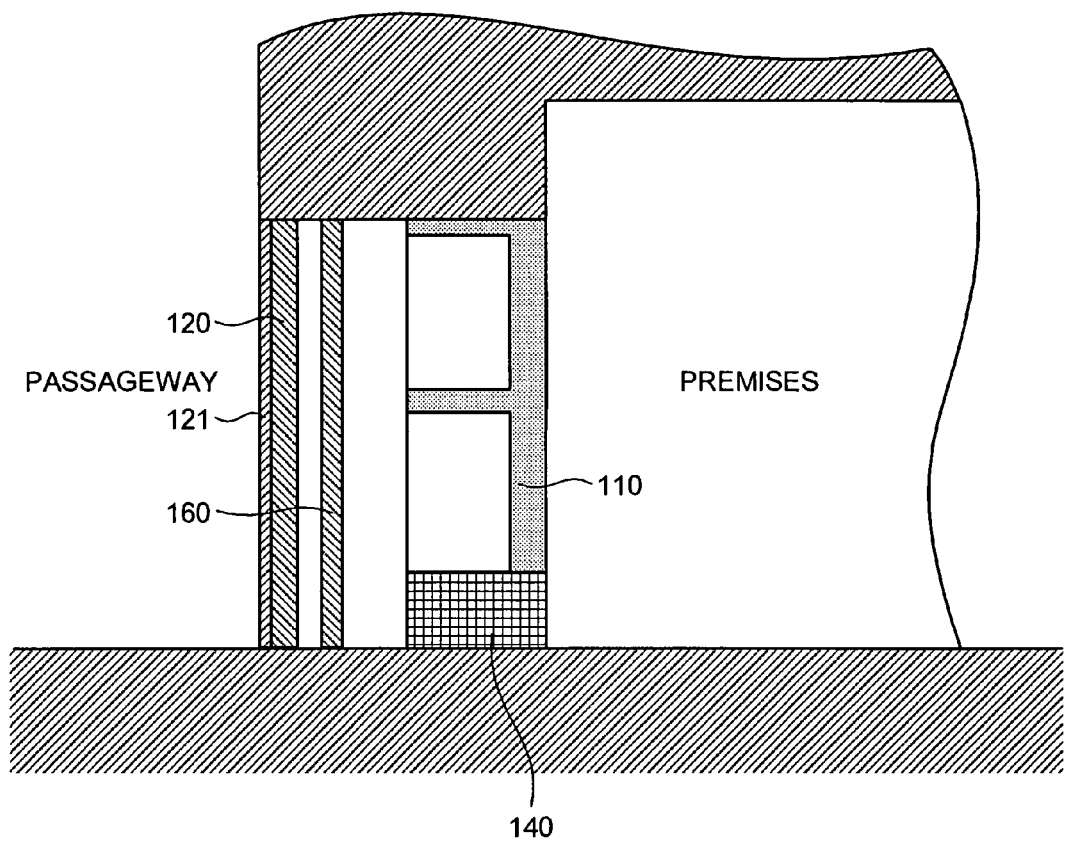
FIG. 3 is a cross section of a structure of the sales supporting apparatus shown in FIG. 2.

FIG. 1 is a block diagram of a sales supporting apparatus 10 for clothes according to an embodiment of the present invention. FIG. 2 is a schematic for explaining a situation where the sales supporting apparatus 10 is installed in an area between an entrance 1 and an external wall 2 of a shop, which has conventionally been used as a shop window. FIG. 3 is a cross section of a structure of the sales supporting apparatus 10. The structure of the sales supporting apparatus 10 is explained below.

As shown in FIG. 1, the sales supporting apparatus 10 includes a showcase unit 110, a display unit 120, a memory unit 130, a control unit 140, an operating unit 150, a half mirror 160, an information communication unit 170, a sales processing unit 180, a location detecting unit 190, and an input unit 200.

As shown in FIGS. 2 and 3, the showcase unit 110 displays products to be sold by the sales supporting apparatus 10 and is installed on a sidewall inside the shop. In the showcase unit 110, clothes are displayed on a shelf, hanger, or a mannequin. The showcase unit 110 is constituted so that front sides of the products face an internal side of the sales supporting apparatus 10 (opposite to a side toward inside of the shop) and the products displayed can be viewed from an opposite side of the showcase unit 110. The showcase unit 110 is integrated with the display unit 120.

The display unit 120 displays, on a large-sized transmissive screen, product information about the products displayed in the showcase unit 110. According to the embodiment, the display unit 120 is a large-sized transparent liquid crystal display (LCD). In the sales supporting apparatus 10, because the large-sized transparent LCD is used as the display unit 120, it is possible to view the products displayed in the showcase unit 110 through the transparent LCD when the product information is not displayed on the display unit 120. Accordingly, when a user passes by the sales supporting apparatus 10 and if the product information is not displayed on the display unit 120, the user can view the products displayed in the showcase unit 110 through the large-sized transmissive LCD, making it possible to view real products.

Upon displaying the product information on the display unit 120, it is possible to display the product information at any locations on the large-sized transparent LCD. The product information displayed on the display unit 120 can be color information of a product, still image information or moving image information that represents variations in shapes and sizes of the product, or still image information or moving image information that represents same displayed product from different directions. By displaying the above product information on the display unit 120 in such a manner that real products and virtual related information are alternately displayed on the display unit 120 as appropriate, it is possible to clearly present information about the product or related information about the product to a user.

A desired size of the display unit 120 (the large-sized transparent LCD) is such that is larger than a full scale of the product to be displayed in the showcase unit 110. In this manner, a user can view the product in a full scale in the sales supporting apparatus 10 and can feel reality of the product, upon purchasing the product using the sales supporting apparatus 10. A size of the display unit 120 needs to be at least the same as that of the showcase unit 110. At this state, if the product information is not displayed on the display unit 120, all the products displayed in the showcase unit 110 can be viewed in a full scale. According to the embodiment, the size of the display unit 120 is such that a life-sized image of a person can be displayed thereon.

In this manner, compared to the Internet shopping, because the display unit 120 is constituted of the large-sized transparent LCD, a number of products can be listed on the display unit 120 and the products can be recognized by a customer even from a distance, thereby making it possible to attract the customer to purchase the product even when the customer is not interested in purchasing the product. Furthermore, because the customer can view the product in a full scale and can choose the product based on a look of a real product, it is possible for the customer to purchase the product without anxiety, similarly to a purchase of a product in a real shop.

A transparent touch-panel sheet 121 is attached to an exterior surface of the display unit 120 and is used by a user upon operating the sales supporting apparatus 10. With the touch-panel sheet 121 attached, it is possible for the user to easily specify a desired location in the showcase unit 110 by touching the touch-panel sheet 121. When an operation menu is displayed on the display unit 120, the user can easily select a desired operation menu to operate the sales supporting apparatus 10, by touching the touch-panel sheet 121.

The memory unit 130 stores therein information related to the products. The memory unit 130 stores therein information about variation products of a product displayed in the showcase unit 110, such as color information of the product, still image information or moving image information that represents variations in shapes and sizes of the product, or still image information or moving image information that represents same displayed product from different directions. The memory unit 130 further stores therein various information about other products or physical information of a customer, which are obtained from outside. The variation products of the product displayed in the showcase unit 110 are such that have different colors, shapes, or sizes from the product displayed in the showcase unit 110.

The control unit 140 includes an interactive function that responds to instruction information from a user, controls a display of the product information on the display unit 120, and controls the entirety of processings performed by the sales supporting apparatus 10, such as a sales processing of the products or of the variation products. With the interactive function and the various information stored in the memory unit 130, it is possible for a user to check a product from various directions, to check a variation in sizes, and to check whether the product displayed matches other products or whether the product displayed matches a physical condition of the user, so that the user can carefully check whether the product is suitable for the user before purchasing the product.

Figure 4:
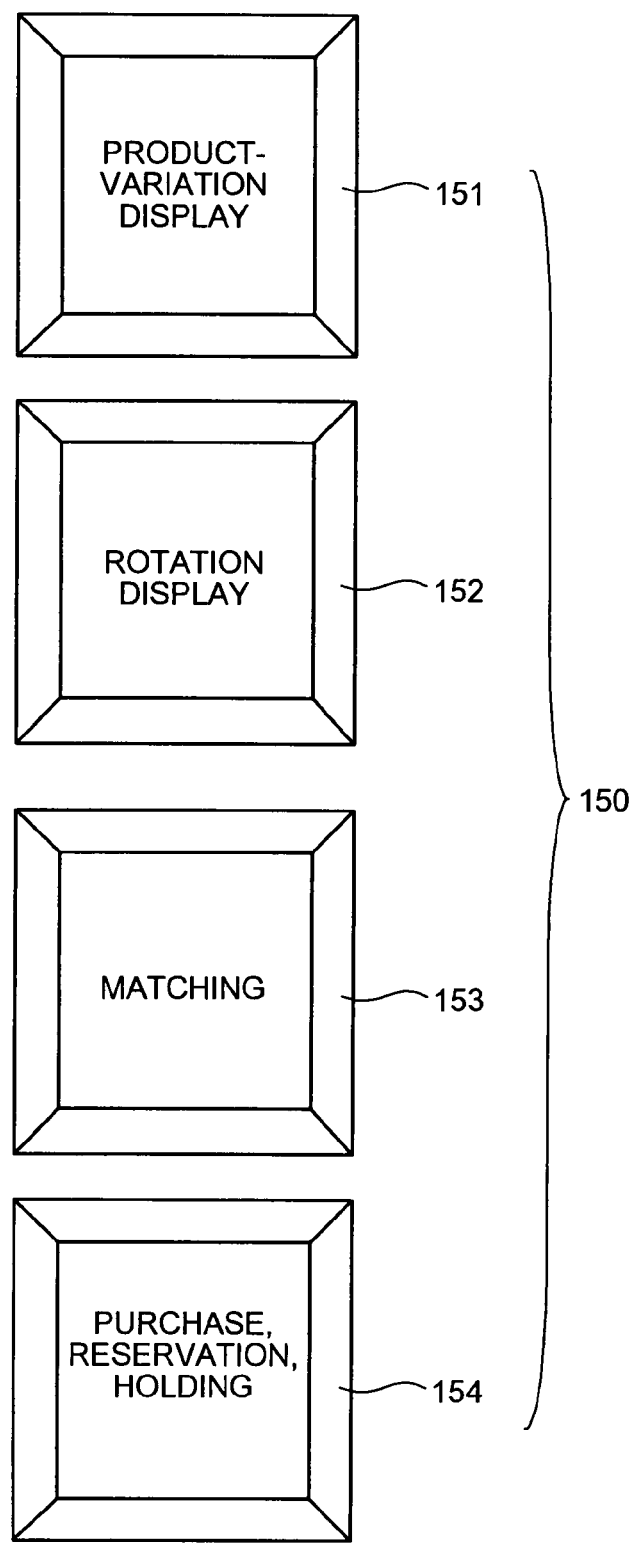
FIG. 4 is an enlarged view of an operating unit shown in FIG. 2.

The operating unit 150 is for operating the sales supporting apparatus 10 by a user, upon inputting the instruction information. FIG. 4 is an enlarged view of the operating unit 150. As shown in FIG. 4, the operating unit 150 includes, as a hard button provided near a periphery of the surface of the sales supporting apparatus 10 (on the side of the display unit 120), a product-variation-display selection button 151 for selecting a display of variation such as colors of a selected product, a rotation-display selection button 152 for selecting a rotation display of the selected product, a matching selection button 153 for selecting a matching of the selected product, and a purchase-reservation-holding selection button 154 for selecting a purchase, a reservation, or a holding of the selected product (to pick up the product when the shop is open in the future).

With the selection buttons, each of the functions can be selected for the product selected. In the sales supporting apparatus 10, after each of the functions is selected by the hard buttons, menu selection buttons for a next step are displayed on the display unit 120 so that various menus can be selected and performed using the touch-panel sheet 121. Details of processings for the product variation display for colors and shapes, the rotation display, the matching, and the purchase-reservation-holding are explained later.

The half mirror 160 reflects thereon a mirror image of physical information of the user, upon performing a matching function explained later. A light transmission condition of the half mirror 160 is set to be transmissive at a normal operation, so that an inside of the showcase unit 110 can be viewed. On the other hand, when the user selects the matching function, the light transmission condition is changed so that the half mirror 160 is used as a mirror that reflects thereon a body image of the user. Upon performing the matching function, by reflecting a mirror image of the user on the half mirror 160 and using the mirror image as the physical information of the user, it is possible to perform the matching function without acquiring the physical information of the user as a data in the sales supporting apparatus 10. Accordingly, it is not required for the user to input the physical information of the user to the sales supporting apparatus 10, thereby making it possible to reduce a fear of the user about a leakage of the physical information of the user to the other people.

The information communication unit 170 communicates various data information between the sales supporting apparatus 10 and a terminal device of the user. The sales processing unit 180 performs a sales processing for the products displayed in the showcase unit 110 and variation products of the displayed products. The variation products are the products that have different colors, shapes, or sizes from the products displayed in the showcase unit 110. The location detecting unit 190 is constituted of a radio frequency identification (RFID) 191 and an RFID reader 192 to automatically recognize where the product is displayed in the showcase unit 110. The input unit 200 is used for inputting a predetermined data such as an input of an identification (ID).

Figure 5:
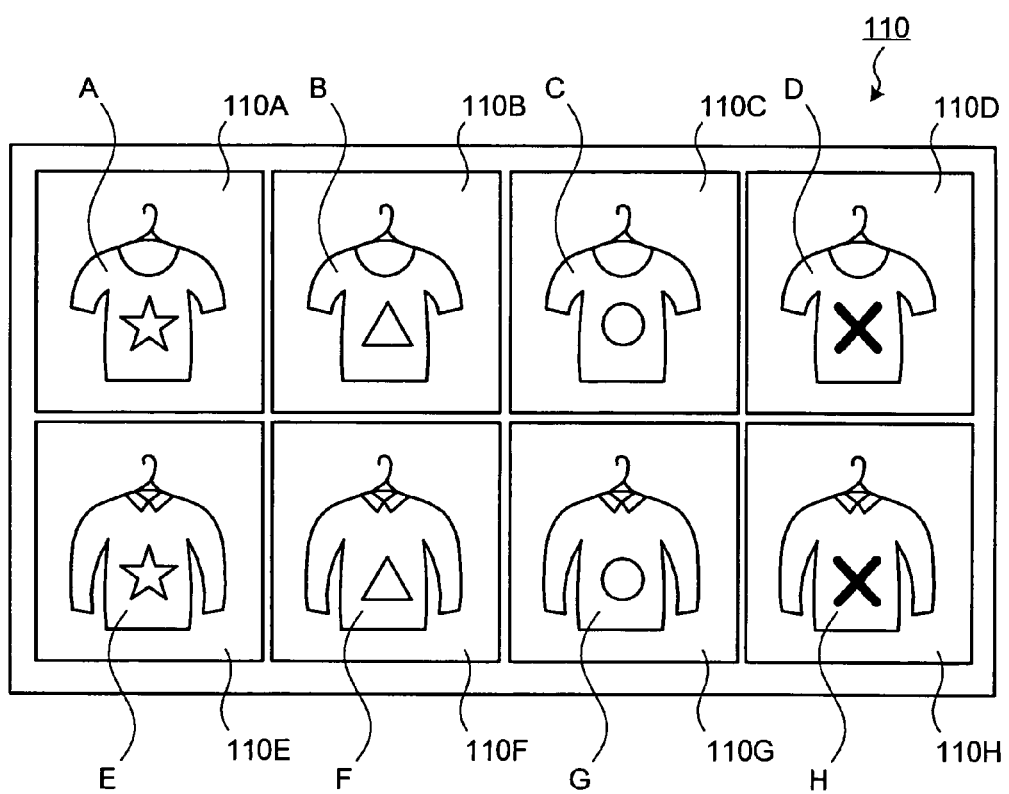
FIG. 5 is a schematic for explaining a situation where products are displayed in a showcase unit shown in FIG. 2.

It is explained below how to display the products in the showcase unit 110 with reference to FIG. 5. The showcase unit 110 is constituted of eight showcase areas 110A to 110H that are separate areas for displaying the products. For example, a shirt in a different design is put on a hanger and displayed in each of the showcase areas 110A to 110H. In other words, a short-sleeve shirt A is displayed in the showcase area 110A, a short-sleeve shirt B in the showcase area 110B, a short-sleeve shirt C in the showcase area 110C, a short-sleeve shirt D in the showcase area 110D, a short-sleeve shirt E in the showcase area 110E, a short-sleeve shirt F in the showcase area 110F, a short-sleeve shirt G in the showcase area 110G, and a short-sleeve shirt H in the showcase area 110H.

The RFID 191 is attached to each of the products displayed in the showcase unit 110 and the RFID reader 192 is attached to each of the showcase areas 110A to 110H. In this manner, when a shop staff displays the products in the showcase unit 110, display-location information of a product, which indicates in which showcase area the products is displayed, can be automatically recognized by the RFID 191 attached to each of the products and the RFID reader 192 attached to each of the showcase areas 110A to 110H, and the display-location information recognized is stored in the memory unit 130. Accordingly, it is possible to automatically acquire and store in the memory unit 130 the display-location information of the product displayed in the showcase unit 110 without inputting location data of the product by a shop staff in a shop, and therefore, operations performed by the shop staff can be simple.

In other words, by integrating the showcase unit 110 and the display unit 120 and by attaching the RFID 191 to a product and the RFID reader 192 to the showcase unit 110, it is possible, at a shop, to effectively acquire and store in the memory unit 130 the display-location information of the product displayed in the showcase unit 110. For example, the RFID 191 is attached to each of the shirts and the RFID reader 192 is attached to each of the showcase areas 110A to 110H. Accordingly, when a shop staff displays the products in the showcase unit 110, the display-location information of the products, which indicates in which showcase area the products is displayed, can be automatically recognized by the RFID 191 attached to each of the products and the RFID reader 192 attached to each of the showcase areas 110A to 110H, and the display-location information recognized is stored in the memory unit 130.

In this manner, when a customer or a shop staff selects a predetermined location corresponding to the showcase unit 110 using the touch-panel sheet 121 (the touch-panel sheet 121 corresponding to a location where the showcase unit 110 can be viewed in a transmissive manner), information about which product is selected is created and sent to the control unit 140.

Figure 6:
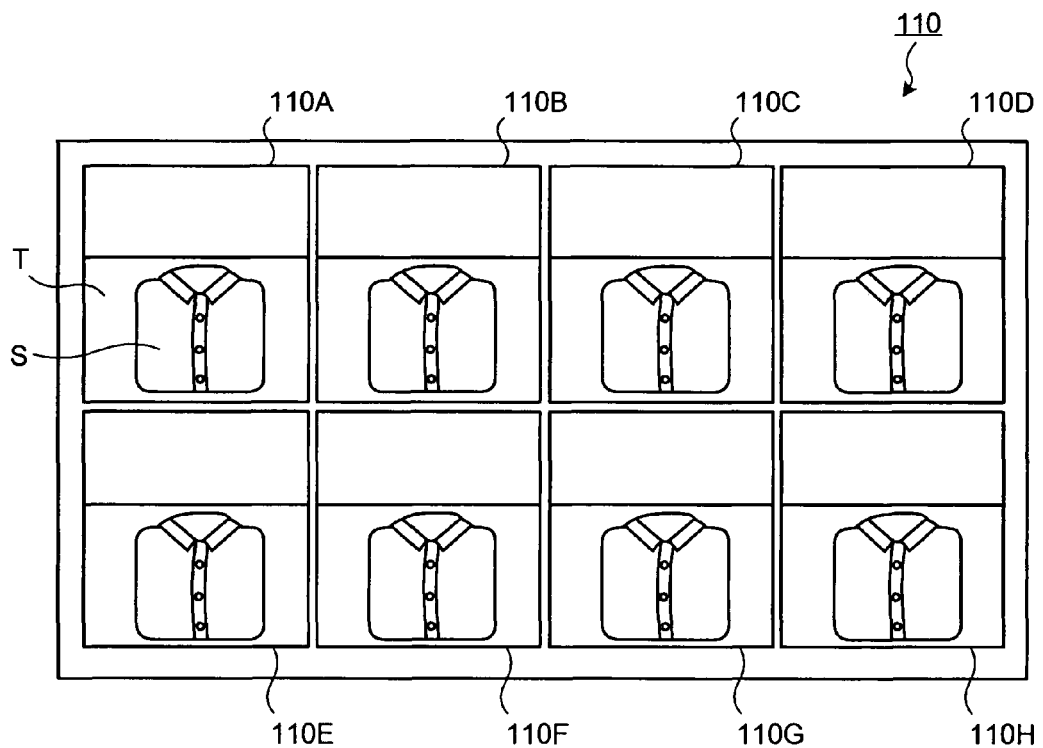
FIG. 6 is a schematic for explaining a situation where shirts are displayed in a folded manner on tilted plates to present main portions of the shirts in showcase areas of the showcase unit shown in FIG. 2.
Figure 7:
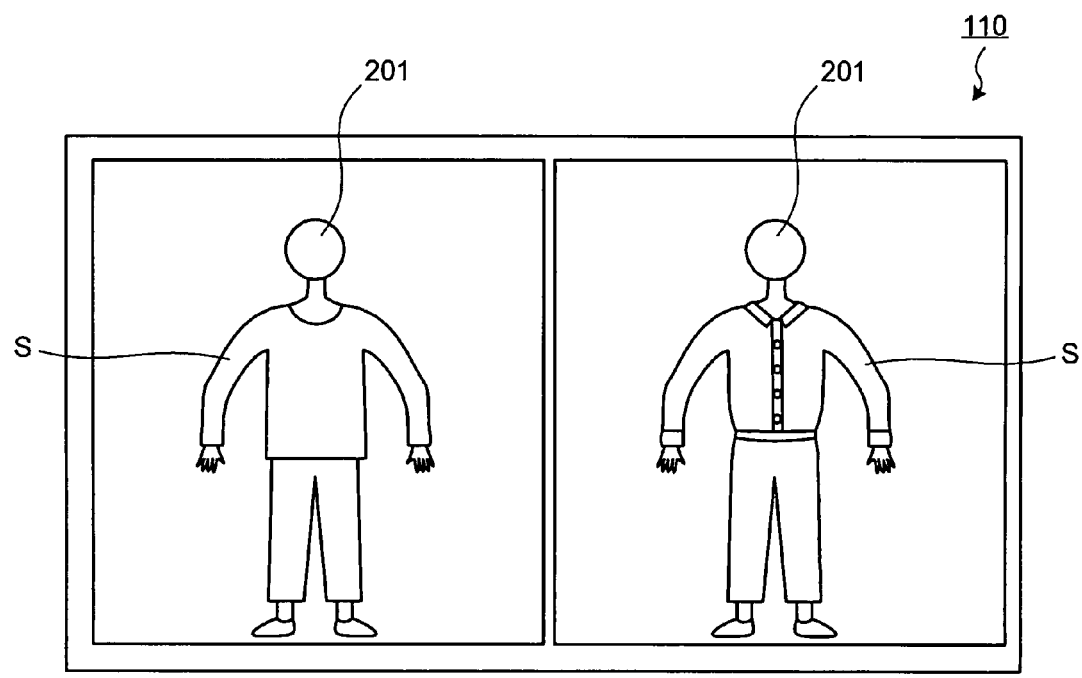
FIG. 7 is a schematic for explaining a situation where shirts are put on mannequins for a display in showcase areas of the showcase unit shown in FIG. 2.

A manner for displaying the products in the showcase unit 110 is not limited to a specific manner and any modifications can be acceptable. For example, as shown in FIG. 5, it is possible to display the shirts in the showcase areas by putting the shirts on hangers, so that the entirety of each of the shirts can be viewed. Alternatively, as shown in FIG. 6, it is acceptable to fold a shirt S so that a main portion of the shirt S can be viewed, and to put the shirt S on a tilted plate provided in the showcase area for a display. It is also acceptable to modify a space of each of the showcase areas by combining the display manners shown in FIGS. 5 and 6, so that the shirts are displayed in each of the showcase areas 110A to 110D in the display manner shown in FIG. 5 while the shirts are displayed in each of the showcase areas 110E to 110H in the display manner shown in FIG. 6. It is still acceptable to put on the shirts on a mannequin 201 for a display in the showcase area, as shown in FIG. 7. In FIG. 7, an example in which the showcase unit 110 is constituted of two showcase areas is shown.

Functions of the product variation display, the rotation display, the matching, and the purchase-reservation-holding described above in relation to an explanation of the operating unit 150 are explained below. The product variation display is a function that displays still image information or moving image information of the variation products of a selected product, in an area of the display unit 120 where the products other than the selected product are displayed, while the selected product is continuously displayed in a transmissive manner. For example, the still image information or the moving image information that represents variations in colors, shapes, or sizes of the selected product is displayed. The information about the variation products are displayed based on information about the variation products stored in the memory unit 130. For displaying the information about the variation products in a full scale, image information and scale information are stored in the memory unit 130 so that the image information can be enlarged to a full scale upon displaying. Because the selected product and the variation products can be compared one another by performing the product variation display, a user can select a suitable and desired product from among a number of selectable products.

The rotation display is a function that displays a three-dimensional (3D)-model image of a selected product on the display unit 120 where the selected product is displayed in a transmissive manner, so that the 3D-model image can be rotated by touching a touch panel of an area where the 3D-model image is displayed. For example, an image of the product viewed from a cross direction or a backside of the product, or an upside-down moving image can be displayed.

The above rotation display is performed based on product information stored in the memory unit 130. To display the 3D-model image in a full scale, image information and scale information are stored in the memory unit 130 to enlarge the image in a full scale upon displaying. Because a view from a cross direction or a backside of the product can be viewed by performing the rotation display, which is cannot be viewed in a state displayed in the showcase unit 110, a user can carefully check the product to select a suitable and favorite product.

The rotation display can be performed not only by using the 3D-model image of a product but also by using still images or moving images of the selected product viewed from different directions from that displayed in the showcase unit 110 so that the still images or the moving images are alternately displayed one another. It is still acceptable to take images of a product from different directions and to create a 3D-model image based on the taken images.

The matching is a function that superimposes an image of the selected product for a display on an image of a physical condition (figure) of a user or an image of other belongings of the user. Because a user determines whether to purchase a product based particularly on information about a size of a real product or about whether the real product matches the physical condition (figure) of the user or other belongings of the user, the sales supporting apparatus 10 is constituted to provide the above information. In this manner, it is possible for the user to determine on the spot whether to purchase the product, otherwise the user may put off a purchase of the product to check above condition, and therefore, it is possible to improve a probability of a product purchase of the user. Because the user can determine the above condition on the spot and can purchase the product immediately when the product matches the condition, it is advantageous for the user that the user does not need to revisit the shop after checking the condition, making it possible to purchase the desired product without making unnecessary effort.

The matching processing is performed in such a manner that the user reflects a mirror image of the user on the half mirror 160 to use the mirror image as the physical information of the user and the product image is superimposed on the mirror image. In other words, if the product image is displayed on the display unit 120 located in front of the mirror image of the user reflected on the half mirror 160, it is possible to create an image as if the product image is superimposed on the figure of the user reflected on the half mirror 160. The clothes are displayed at a standard position and can be adjusted to the mirror image by dragging the image of the clothes by the user. Through the matching processing performed, it is possible for the user to carefully determine which product is suitable for the user by matching the products that have different colors or different sizes with the body image (mirror image) of the user.

Alternatively, it is possible for the user to store the physical information of the user (including image data and scale ratio) in a portable terminal (including an integrated circuit (IC) card), so that the physical information (image data) is retrieved to be stored in the memory unit 130 via the information communication unit 170. In this case, the physical information of the user stored in the memory unit 130 is displayed on the display unit 120 and the product image is superimposed on the displayed physical information to perform the matching processing.

A communication method for a data between the portable terminal (including the IC card) and the information communication unit 170 can be such that uses a wireless local area network (LAN), a universal serial bus (UBS), an infrared ray, an ultra-wideband (UWB), or other wireless methods. At this state, it is also acceptable to employ other methods in which a communication is established when the portable terminal and the information communication unit 170 come close to a predetermined distance, in which an authentication is performed as appropriate, or the like. It is still acceptable to employ a contact method in which a contact-type IC or a connector is inserted to the sales supporting apparatus 10, alternative to the wireless method.

Furthermore, it is still possible to perform the matching processing by attaching a camera on a top portion of the display unit 120, taking an image of the user by the camera, and superimposing the taken image on the product image.

As for a method of transferring data, in addition to the above described method in which the image data is stored in the portable terminal or the like to be carried so that the image data is retrieved from the portable terminal, it is also acceptable to store the image data in a predetermined service or the like in a network of the shop and the image data is retrieved by performing an identity authentication. In this case, the identity authentication using an ID can be performed by storing a unique ID in a noncontact IC such as the RFID 191 and retrieving the stored ID as appropriate, or by performing biometrics (i.e., fingerprint, iris, hand vein, human face recognition, or speaker recognition)

It is still possible for the user to store in the portable terminal (including the IC card) an image data of products of which the user purchased in the past and currently owns, so that the image data can be retrieved and stored in the memory unit 130 via the information communication unit 17. In this case, the matching processing can be performed by superimposing the above image data on the image of the selected product, and therefore, the user can immediately check whether the product currently being selected matches the product purchased in the past without bringing a real product on the spot. For example, the user can immediately check whether a shirt currently being selected matches a trouser purchased in the past without bringing the trouser. If the user purchased the product at the same shop in the past, it is possible to retrieve an image of the product stored in the memory unit 130 using a user ID.

The purchase-reservation-holding function performs each processing of a purchase, a reservation, or a holding for the selected product. If the user likes the selected product, the user inputs an ID in the sales supporting apparatus 10. As for the above ID, an ID unique to the user can be used, such as an ID of a card issued by the shop, credit card numbers, or biometrics information. Because it is not necessary to perform a payment processing for a payment of the product in the reservation and the holding processings, and in this case, it is exclusively necessary for the user to present the ID when the user appears in the shop in the future, the user does not need to present detailed personal information on the spot.

On the other hand, when the user purchases the product on the spot, the ID card issued by the shop, a general credit card, or a payment by mobile can be used for a payment. A card reader is provided in the sales supporting apparatus 10 so that the card can be read directly by the reader upon performing a payment with the card. Upon performing a payment by mobile, the user accesses a predetermined site on the Internet to perform a processing.

Upon inputting a staff ID when the shop staff comes to the shop in the morning, information is displayed on the display unit 120 corresponding to each of the products, indicating which processings among the purchase processing, the reservation processing, and the holding processing have been performed for which product. In this manner, the shop staff can easily check the information about states of the products.

Figure 8:
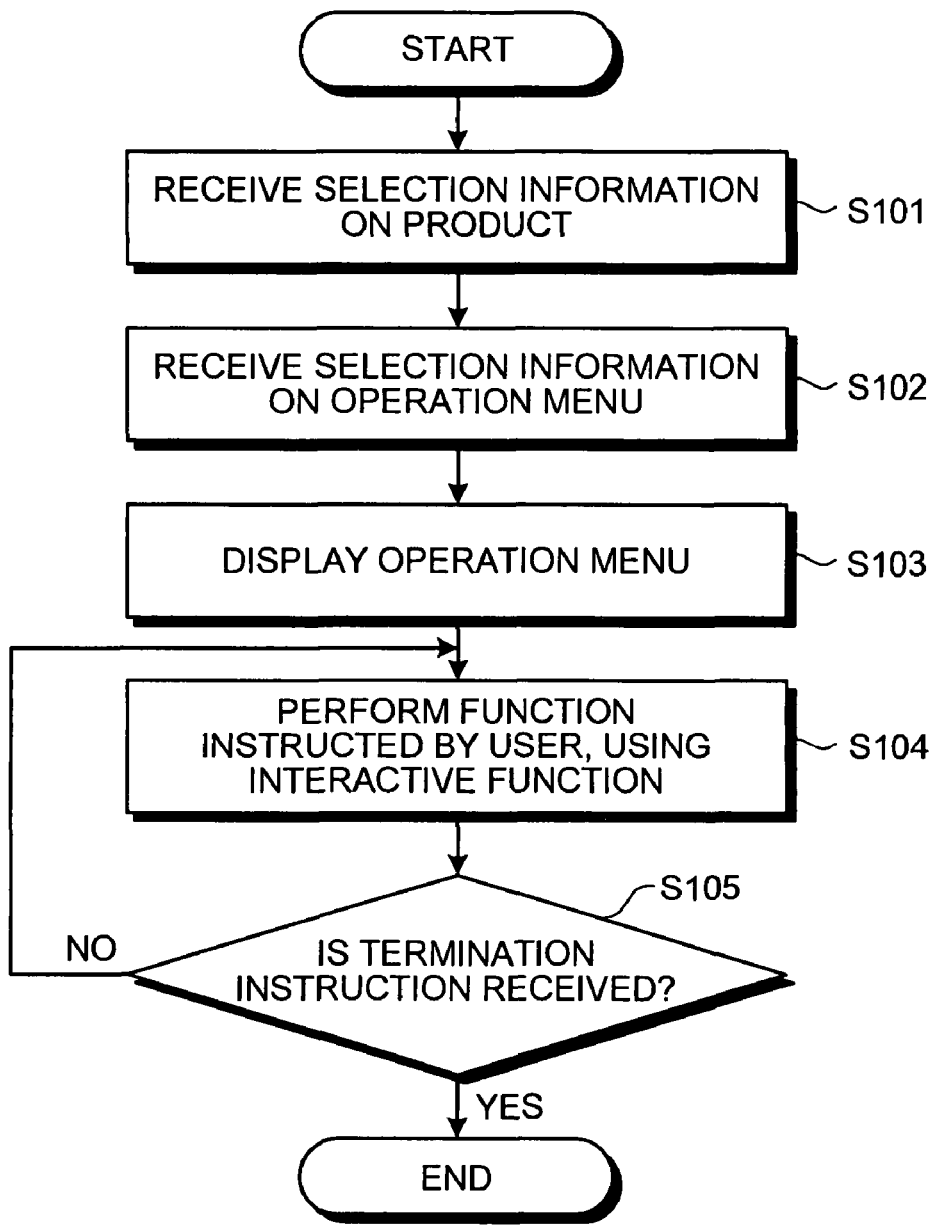
FIG. 8 is a flowchart of a general process performed by the sales supporting apparatus shown in FIG. 1.

An entire process of an operation performed by the sales supporting apparatus 10 is explained with reference to FIG. 8. When the user passes by the sales supporting apparatus 10 and if the display unit 120 and the half mirror 160 are transparent thereby not displaying the product information on the display unit 120, the user can view the products displayed in the showcase unit 110 from a front side of the sales supporting apparatus 10 (a side of the touch-panel sheet 121), over the touch-panel sheet 121, the display unit 120, and the half mirror 160.

At this state, if the user likes the product displayed on the showcase unit 110 upon viewing the product over the display unit 120, the user can select the product by touching a position corresponding to the product selected on the touch-panel sheet 121 on the surface of the display unit 120. In the sales supporting apparatus 10, the touch-panel sheet 121 receives product-selection information (step S101), and sends the information to the control unit 140.

When the user selects a button corresponding to a desired function in the operating unit 150, the sales supporting apparatus 10 receives that operation-menu selection information is selected (step S102) and sends selected information to the control unit 140. The control unit 140 controls so that an operation button of a menu for a next step to be operated for the product is displayed on a predetermined position of the display unit 120 (step S103). A display position of the operation menu can be a position corresponding to a showcase area of the selected product on the display unit 120, can be other positions corresponding to other showcase areas for products other than the selected product, or can be a predetermined special position for displaying the operation menu. If the user has the portable terminal, an operation list available for the product can be displayed on a screen of the portable terminal so that the user can perform a desired operation by selecting a desired menu from the screen of the portable terminal.

The user instructs a desired function by selecting the operation button displayed on the display unit 120. The sales supporting apparatus 10 receives the instruction of the function selected by the user and performs instructed various functions using an interactive function (step S104). After performing a predetermined function, the sales supporting apparatus 10 determines whether a termination instruction is received (step S105). Upon receiving the termination instruction (YES at step S105), the sales supporting apparatus 10 returns a state of the display unit 120 to an initial state and terminates a series of the processes. On the other hand, when the termination instruction is not received (NO at step S105), the sales supporting apparatus 10 returns the process to step S104 and performs a predetermined function.

Figure 9:
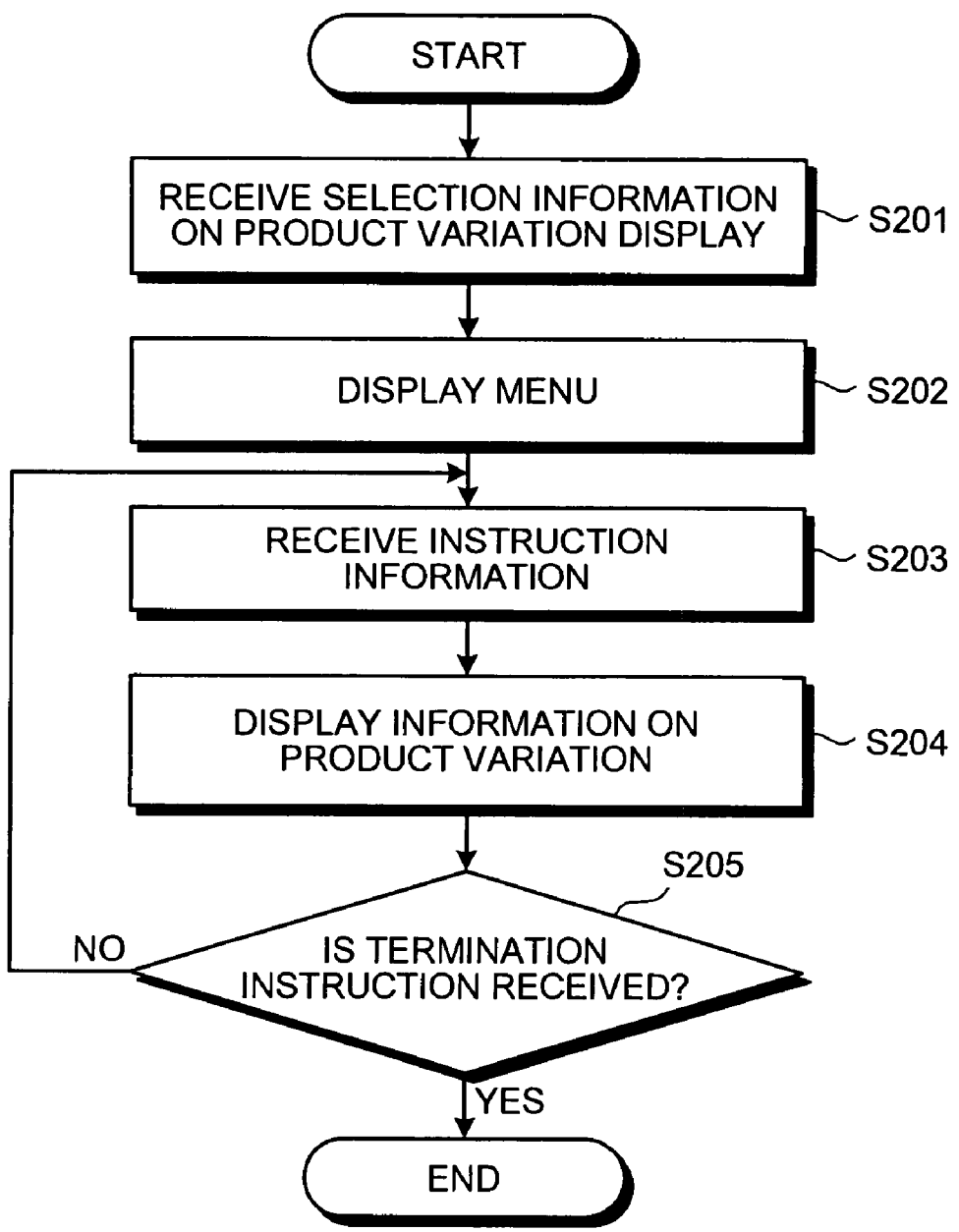
FIG. 9 is a flowchart of a process of a product-variation display function performed by the sales supporting apparatus shown in FIG. 1.

Next, a process for performing the product-variation-display function is explained with reference to a flowchart shown in FIG. 9. The process for selecting the product is the same as those explained above, and therefore, an explanation thereof is omitted. A process after the user selects the product is explained.

After a selection process of the product, when the user selects the product-variation-display selection button 151 from the operating unit 150, the operating unit 150 receives information indicating that the product-variation-display selection button 151 is selected (step S201), and sends selection information indicating that the product-variation-display selection button 151 is selected to the control unit 140. The control unit 140 receives the selection information and displays an operation button of a menu for a next step to be operated to the previously selected product on a predetermined position of the display unit 120 (step S202). The display position of the operation menu can be a position corresponding to a showcase area of the selected product on the display unit 120, can be other positions corresponding to other showcase areas for products other than the selected product, or can be a predetermined special position for displaying the operation menu. As for the operation button, a color-variation display selection button for selecting a display of a color variation of the product, a shape-variation display selection button for selecting a display of a shape variation of the product, a size-variation display selection button for selecting a display of a size variation of the product, a termination button, or the like are displayed.

By selecting an operation button by touching the touch-panel sheet 121 on a position corresponding to the operation button displayed on the display unit 120, the user instructs a function of a desired product variation display. The touch-panel sheet 121 receives instruction information selected by the user (step S203), performs instructed function using the interactive function, and performs the product variation display of the product using still image information or moving image information (step S204).

After performing the product variation display of the product, the touch-panel sheet 121 determines whether the termination instruction is received (step S205). When the touch-panel sheet 121 receives the termination instruction, that is, senses a touching of the termination button (YES at step S205), the control unit 140 returns a state of the display unit 120 to the initial state and terminates a series of the processes.

On the other hand, when the touch-panel sheet 121 receives the termination instruction, that is, does not sense a touching of the termination button (NO at step S205), the sales supporting apparatus 10 returns a process to step S203 and receives instruction information to perform a predetermined function.

Figure 10:
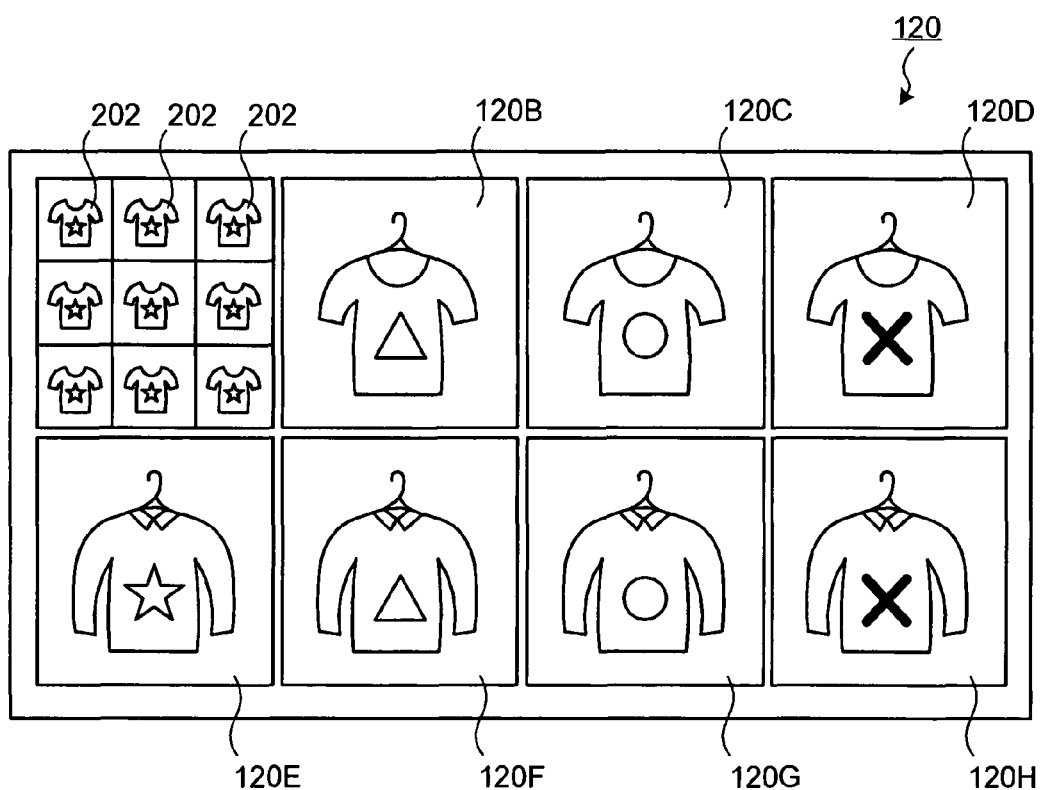
FIG. 10 is a schematic for explaining a situation where color variation images of a selected shirt are displayed on divided screens in a display unit corresponding to a showcase area of the selected shirt, according to the embodiment.

A manner of displaying the still image information or the moving image information of the variation products is not limited to a specific manner. For example, the manner is explained as an example of the product variation display, in which the color variation of the product is displayed upon selecting the color-variation display function for selecting a shirt A displayed in the showcase area 110A. In this case, color variation images 202 of the selected shirt A can be displayed on each of separated areas in the showcase area 110A of the display unit 120, as shown in FIG. 10. At this state, the products displayed in the showcase unit 110 can be continuously viewed from the other display units 120B to 120H in the display unit 120, each of which corresponds to each of the showcase areas 110B to 110H.

Figure 11:
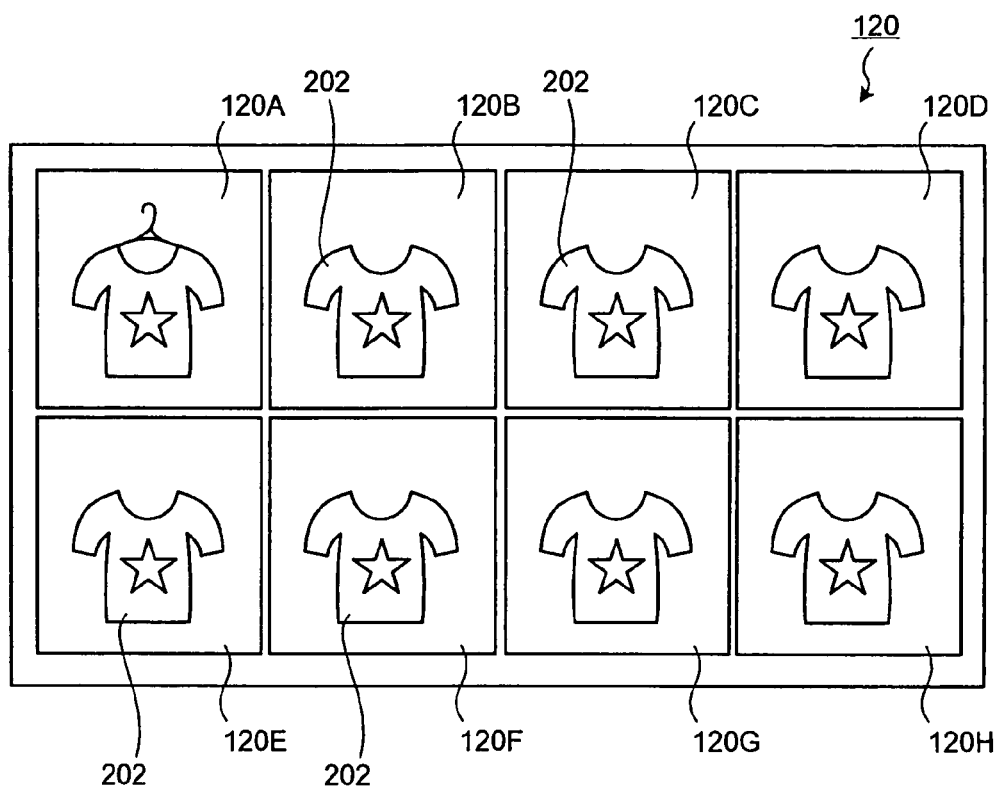
FIG. 11 is a schematic for explaining a situation where color variation images of a selected shirt are displayed on display units other than a display unit corresponding to a showcase area of the selected shirt, according to the embodiment.
Figure 12:
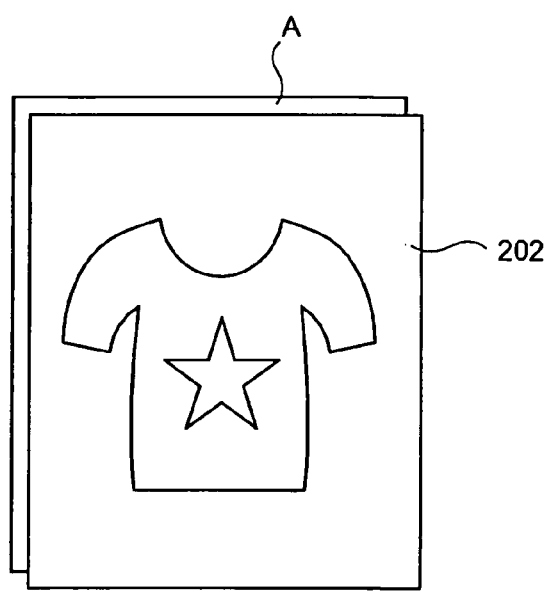
FIG. 12 is a schematic for explaining a situation where a predetermined color shirt image is displayed on a display unit corresponding to a showcase area of the selected shirt, according to the embodiment.

Alternatively, it is also possible to keep a state so that the shirt A displayed in the showcase area 110A can be continuously viewed from a display unit 120A corresponding to the showcase area 110A, and each of the color variation images 202 of the selected shirt A is displayed one by one in the display units 120B to 120H that respectively correspond to the showcase areas 110B to 110H, as shown in FIG. 11. Furthermore, it is also possible to display one by one the color variation images 202 of the shirt A on the display unit 120 corresponding to the showcase area 110A, as shown in FIG. 12.

Figure 13:
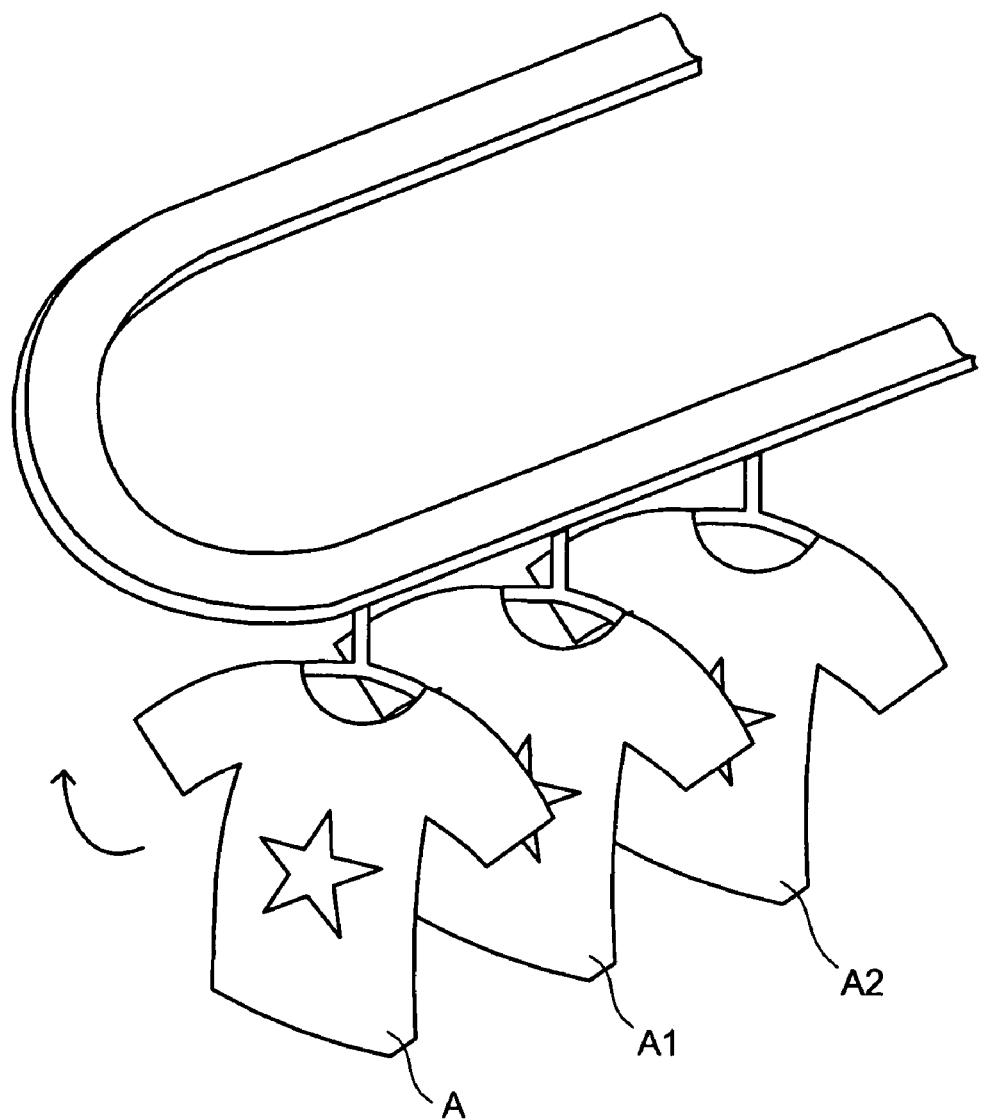
FIG. 13 is a schematic for explaining a situation where a product and variation products are rotatably displayed by a mechanism, according to the embodiment.

Moreover, although it is different from an image display, the color variation products of the shirt A (A1, A2, etc.) can be displayed in a mechanically rotatable manner, so that the shirts are rotated in a mechanism to show real color variations of the shirts A, A1, and A2, as shown in FIG. 13.

Figure 14:
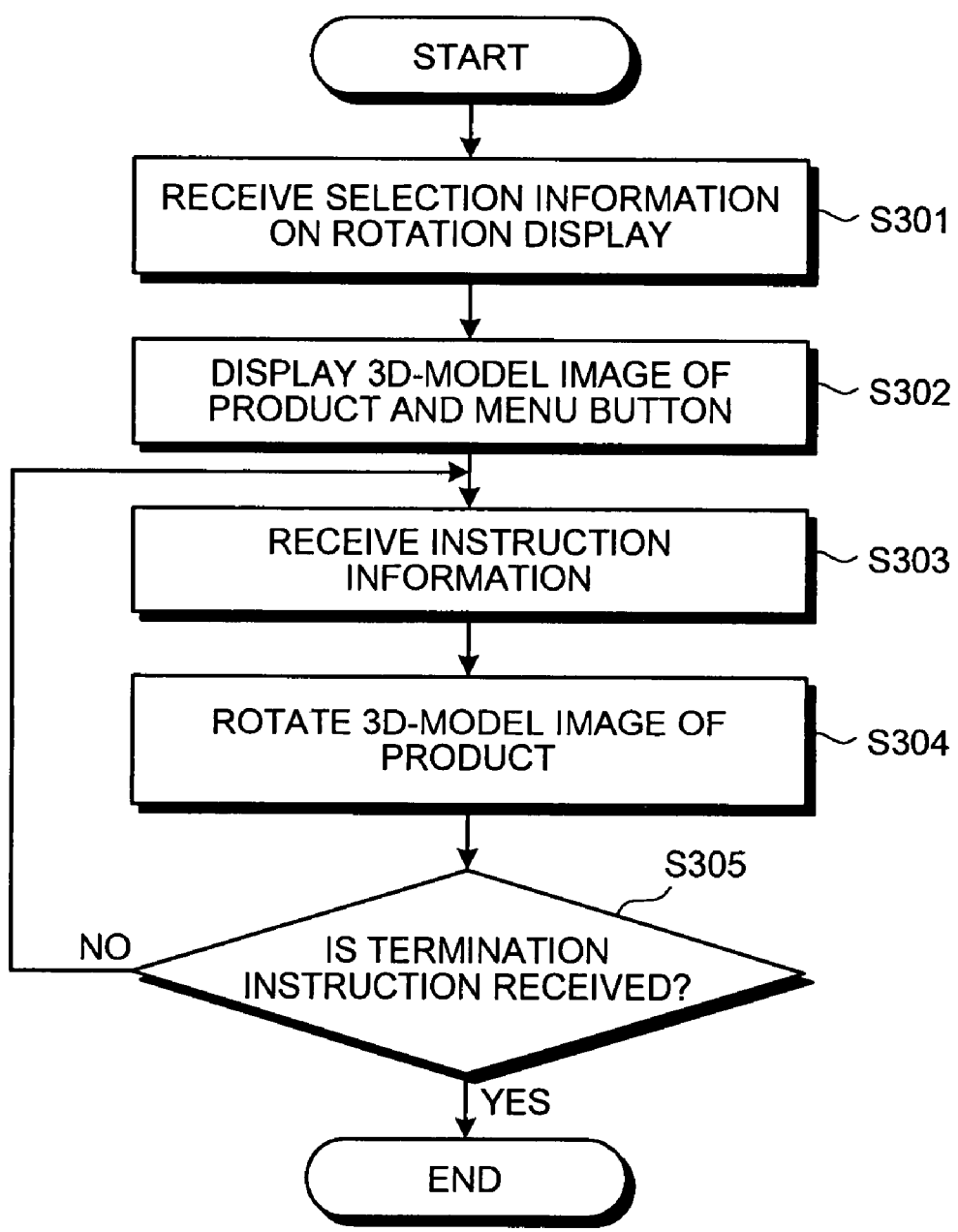
FIG. 14 is a flowchart of a process of a rotation function performed by the sales supporting apparatus shown in FIG. 1.

A process for performing the rotation display function is explained with reference to a flowchart shown in FIG. 14. The process for selecting the product is the same as those explained above, and therefore, an explanation thereof is omitted. A process after the user selects the product is explained.

After a selection process of the product, when the user selects the rotation-display selection button 152 form the operating unit 150, the operating unit receives information indicating that the rotation-display selection button 152 is selected (step S301), and sends selection information indicating that the rotation-display selection button 152 is selected to the control unit 140. The control unit 140 receives the selection information and displays a 3D-model image of the product and an operation button of a menu for a next step to be operated to the 3D-model image on a predetermined position of the display unit 120 (step S302).

A display position of the operation menu can be a position corresponding to a showcase area of the selected product on the display unit 120, can be other positions corresponding to other showcase areas for products other than the selected product, or can be a predetermined special position for displaying the operation menu. As for the operation button, a clockwise rotation button for selecting a display in which the 3D-model image is rotated in a clockwise direction, a counterclockwise rotation button for selecting a display in which the 3D-model image is rotated in a counterclockwise direction, the termination button, or the like are displayed.

Figure 15:
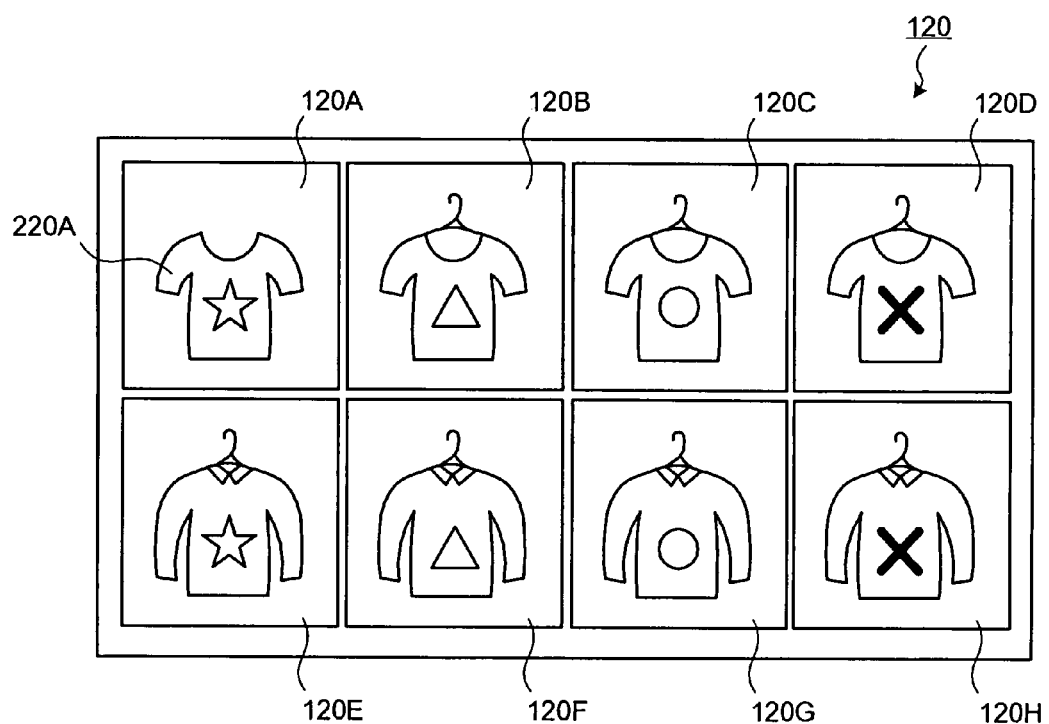
FIG. 15 is a schematic for explaining a situation where a 3D-model image of a selected shirt is rotated for a display of a backside of the selected shirt, according to the embodiment.

The user instructs a desired rotation display by selecting the operation button by touching the touch-panel sheet 121 corresponding to the position of the clockwise rotation button or the counterclockwise rotation button displayed on the display unit 120. The touch-panel sheet 121 receives instruction information selected by the user (step S303), performs instructed function using the interactive function, and performs the rotation display of the product (step S304). In this case, various methods can be employed in which the 3D-model image is kept rotating while the user keeps touching the clockwise rotation button or the counterclockwise rotation button on the touch-panel sheet 121, or in which the 3D-model image is rotated to a predetermined angle once the user touches the clockwise rotation button or the counterclockwise rotation button on the touch-panel sheet 121. For example, a state is shown in FIG. 15, in which a product (shirt) displayed in the display unit 120A is selected and a 3D-model image 220A of the product (shirt) is rotated by 180°, displaying the 3D-model image of the backside of the product (shirt).

After performing the rotation display of the product, the touch-panel sheet 121 determines whether the termination instruction is received (step S305). When the touch-panel sheet 121 receives the termination instruction, that is, senses a touching of the termination button (YES at step S305), the control unit 140 performs a control to return a state of the display unit 120 to the initial state and terminates a series of the processes. On the other hand, when the touch-panel sheet 121 does not receive the termination instruction, that is, does not sense a touching of the termination button (NO at step S305), the sales supporting apparatus 10 returns the process to step S203 and receives instruction information to perform a predetermined function.

Although it is explained that the 3D-model image is rotated by the clockwise rotation button or the counterclockwise rotation button, it is also possible to employ a method in which the 3D-model image is rotated in a direction along which the user traces the touch-panel sheet 121 corresponding to the display unit 120A of the product selected by the user.

Figure 16:
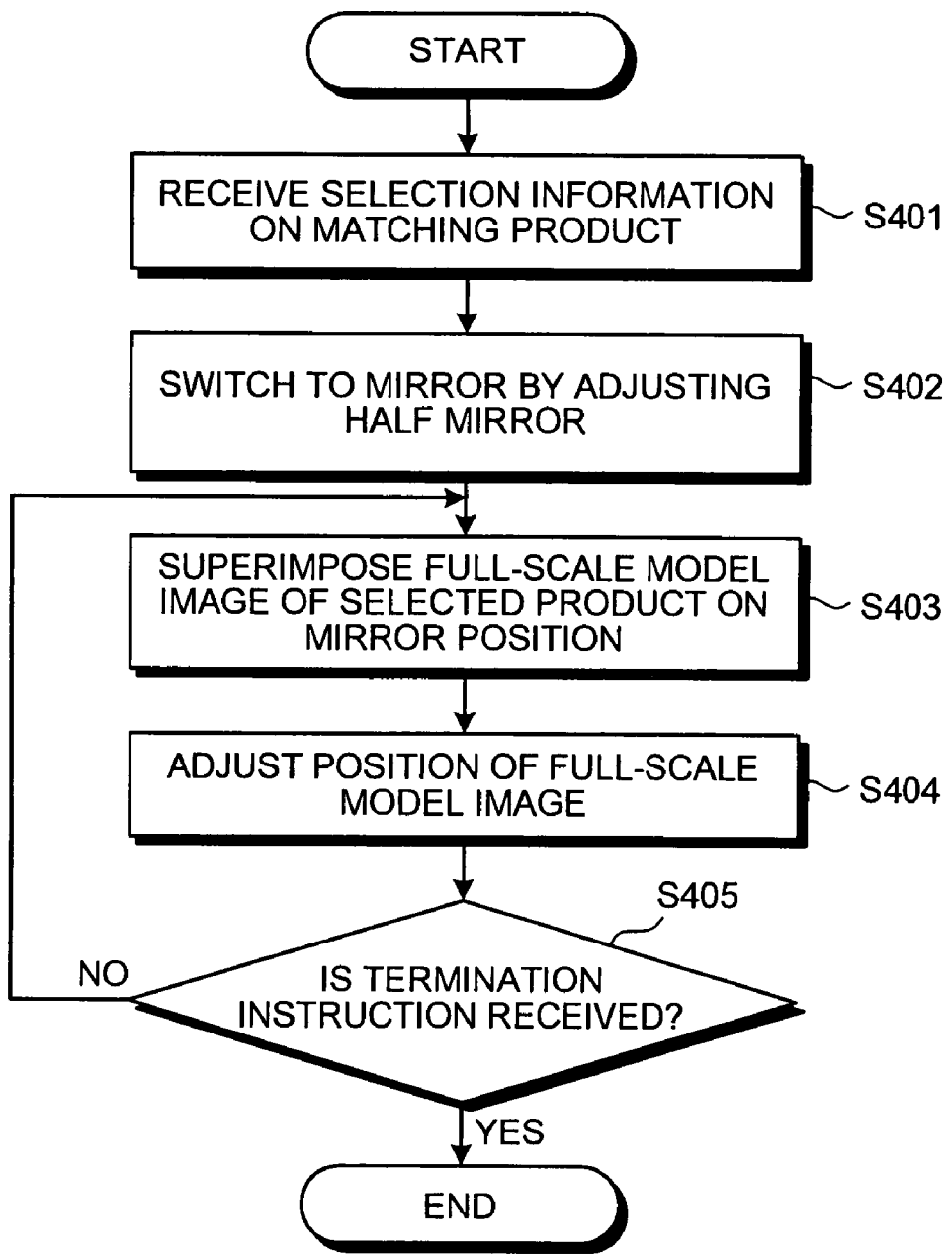
FIG. 16 is a flowchart of a process of a matching function performed by the sales supporting apparatus shown in FIG. 1.

A process for performing the matching function is explained with reference to a flowchart shown in FIG. 16. The process for selecting the product is the same as those explained above, and therefore, an explanation thereof is omitted. A process after the user selects the product is explained.

Figure 17:
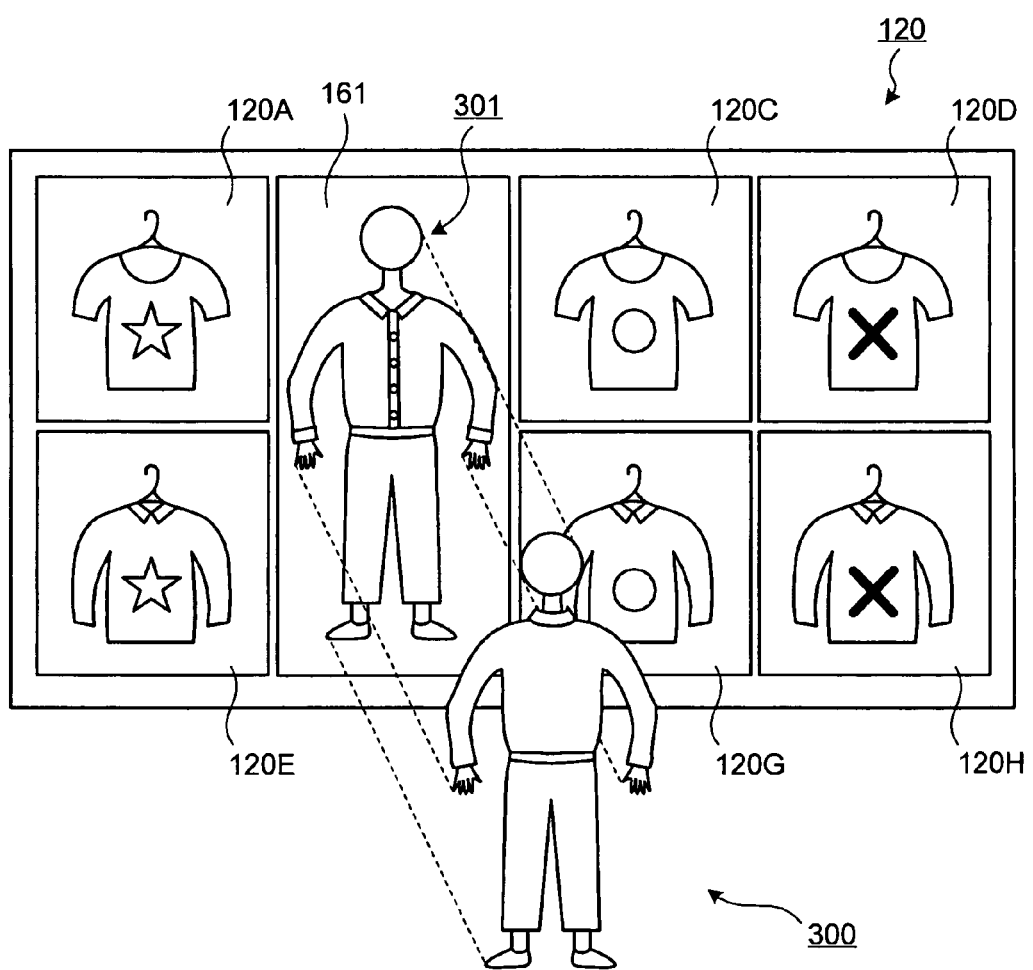
FIG. 17 is a schematic for explaining a situation where a mirror image of a user is reflected on a mirror area of a half mirror, according to the embodiment.

After the selection process of the product, when the user selects the matching selection button 153 from the operating unit 150, the operating unit 150 receives information indicating that the matching selection button 153 is selected (step S401), and sends selection information indicating that the matching selection button 153 is selected to the control unit 140. The control unit 140 receives the selection information, adjusts a lighting of the half mirror, and switches the half mirror 160 of the showcase area 110B adjacent to the showcase area 110A in which the selected product is displayed to a full mirror (step S402). Accordingly, the mirror image of the user is reflected on the mirror. For example, a mirror image 301 of a user 300 is reflected on a mirror area 161 of the half mirror 160 as shown in FIG. 17.

Figure 18:
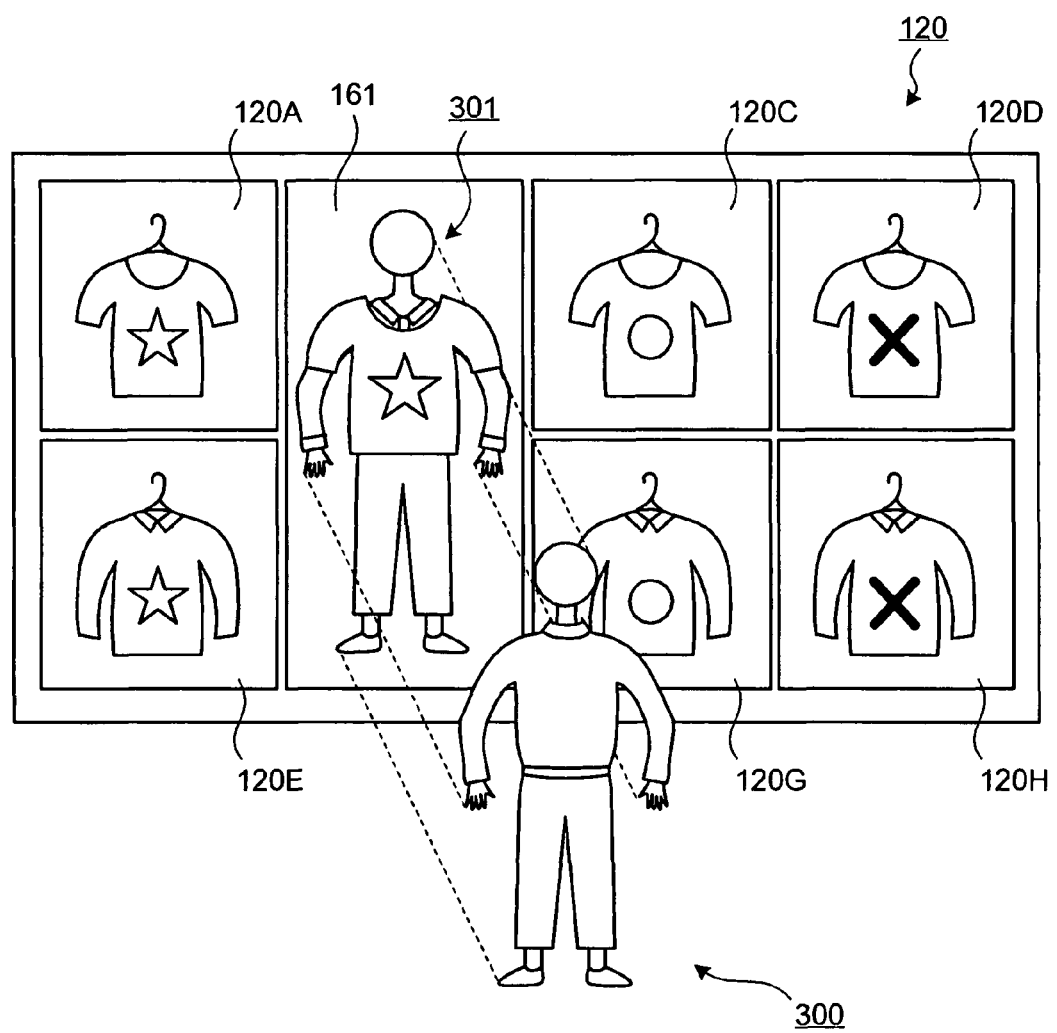
FIG. 18 is a schematic for explaining a situation where a full-scale model image of a selected product is superimposed on the mirror image of the user reflected on the mirror area of the half mirror shown in FIG. 17.

The control unit 140 displays, on the showcase area 110B adjacent to the showcase area 110A in which the selected product is displayed (an area where the half mirror 160 is switched to the full mirror), a full-scale model image of the selected product and an operation button of a menu for a next step to be operated for the full-scale model image, so that the image of the selected product is superimposed on the mirror image of the user (step S403). For example, as shown in FIG. 18, a full-scale model image 205 of the selected product is displayed so that the full-scale model image 205 is superimposed on the mirror image 301 of the user 300 reflected on the mirror area 161 of the half mirror 160. The control unit 140 displays an operation button of a menu for a next step on a predetermined position. As for the operation button, a button for changing the selected product, the termination button, or the like are displayed.

Thereafter, the user adjusts a position of the full-scale model image to the mirror image of the user by dragging the full-scale model image by touching the touch-panel sheet 121 corresponding to the position where the full-scale model image is displayed, as appropriate (step S404), and determines whether the product is suitable for the user.

After performing the matching of the product, the touch-panel sheet 121 determines whether the termination instruction is received (step S405). When the touch-panel sheet 121 receives the termination instruction, that is, senses a touching of the termination button (YES at step S405), the control unit performs a control to return states of the display unit 120 and the half mirror 160 to the initial states and terminates a series of the processes. On the other hand, when the touch-panel sheet 121 does not receive the termination instruction, that is, does not sense a touching of the termination button (NO at step S405), the process control returns to step S403 and detects instruction information to perform a predetermined function.

Figure 19:
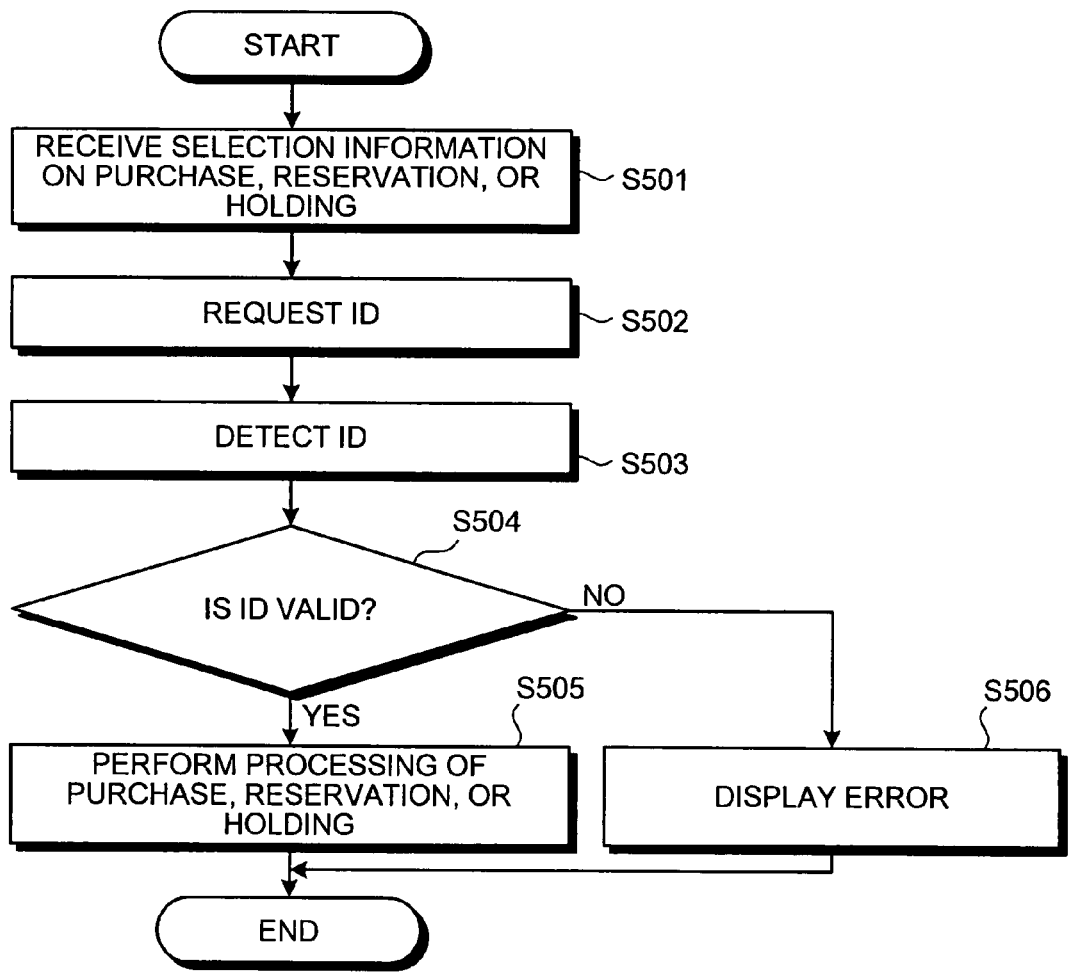
FIG. 19 is a flowchart of a process of a purchase-reservation-holding function performed by the sales supporting apparatus shown in FIG. 1.

A process for performing the purchase-reservation-holding function is explained with reference to a flowchart shown in FIG. 19. The process for selecting the product is the same as those explained above, and therefore, an explanation thereof is omitted. A process after the user selects the product is explained.

After the selection process of the product, when the user selects the purchase-reservation-holding selection button 154 from the operating unit 150, the operating unit 150 receives information indicating that the purchase-reservation-holding selection button 154 is selected (step S501), and sends selection information indicating that the purchase-reservation-holding selection button 154 is selected to the control unit 140. The control unit 140 receives the selection information and displays a message for requesting an ID on a predetermined position of the display unit 120 (step S502).

When the user inputs the ID from the input unit 200 in response to the message, the control unit 140 receives the input of the ID (step S503) and determines whether the ID is valid (step S504). When the ID is valid (YES at step S504), the control unit 140 performs a predetermined purchase-reservation-holding function (step S505) and terminates the process. When the ID is invalid (NO at step S504), the control unit 140 displays a predetermined error message indicating that the ID is invalid on the display unit 120 (step S506) and terminates the process.

Through the above processes, it is possible for the user to easily and assuredly perform an operation such as the purchase, the reservation, or the holding for the selected product, even when the shop is closed. The shop staff can check a result of each of the processes performed by the user when the shop is closed, by displaying information about for which product, for how many products, and when each of the purchase, the reservation, and the holding processes has been performed by the user, on the display unit 120. Accordingly, a result of the purchase-reservation-holding process performed by the sales supporting apparatus 10 can be recognized easily.

According to the sales supporting apparatus 10, because the display unit 120 having a large screen is included, a number of products can be listed and can be easily recognized from a distance, compared to the Internet shopping. Accordingly, it is possible to encourage a customer to purchase a product even when the customer is not willing to purchase the product. Unlike the Internet shopping, the user can check the product in a full scale, can select the product based on a look of the real product, can determine whether to purchase the product based on a careful consideration of the product, and therefore, can purchase the product with confidence.

Furthermore, because the interactive function is included in the sales supporting apparatus 10, it is possible for the user to check the product from different directions, to check variations of the product, and to check whether the product matches other products or whether the product is suitable for the user, unlike an automatic vending machine. Therefore, it is possible for the user to purchase the product based on a careful consideration of the product.

Moreover, because the display unit 120 is constituted in a transmissive manner in the sales supporting apparatus 10, a real product can be viewed through the display unit 120 and other image information can be superimposed on the position corresponding to the product as appropriate. Accordingly, it is possible to clearly present the product and related information on the product to the user, by alternately displaying information about a real product and virtually-created related information.

Furthermore, information can be provided, which is to be used by the user for determining whether to purchase the product and which is about a real size of the product or whether the product matches the figure of the user or other belongings of the user. Accordingly, it is possible for the user to immediately determine whether to purchase the product based on the information, otherwise the user may put off the purchase of the product to consider whether to purchase the product. As a result, probability of product purchase of the user can be improved.

Moreover, upon using physical information of the user for performing the matching function, it is possible not to input the physical information as data in the sales supporting apparatus 10, by alternatively using a mirror. Accordingly, it is possible to relieve a fear of the user about providing the physical information of the user to other people.

Furthermore, because a shelf and a large screen are integrated and an RFID and an RFID reader are combined, a location of a product displayed can be automatically recognized without inputting positional data of the displayed product at the shop. Therefore, it is possible to reduce an operation of the shop staff.

Moreover, a real product can be viewed through the display unit 120, related information on the product (an image viewed from different directions, variations in color and shape, detail information on materials, or the like) can be additionally displayed on the display unit 120, and the product and the related information can easily be presented to the user by alternately displaying the information about the real product and the virtually-created related information about the product. Accordingly, it is possible for the user to carefully consider the product and purchase the product after determining whether the product is suitable for the user. It is also advantageous for the shop to enable the user to carefully check the product like in the shop even when the shop is closed, and to perform a process for the purchase, the reservation, or the holding for the product.

Although it is explained that the large-sized transparent LCD is used as the display unit 120, the display unit 120 is not limited to the large-sized transparent LCD. It is acceptable to use a method in which a transparent electroluminescent (EL) or a film that refracts a light is attached to a transparent glass or a acrylic plate so that an image is projected on the glass by a projector.

Furthermore, although it is explained that the touch-panel sheet 121 is used as a means of recognizing a product selected by the user, other technologies can be used, such as a MIMIO, a technology proposed by KOKUYO Co., Ltd. Japan, in which a position where the user touches on the screen is acquired by a radio wave, or a technology proposed by GestureTek Inc., USA, in which a position where a person points out by gestures of hands is recognized.

Alternatively, it is also possible to use a method in which buttons are provided on the periphery of the display unit 120 so that each of the buttons is associated with a position of each of the showcase areas on the display unit 120, instead of directly touching or pointing out a portion of the screen using the touch panel or the like. For example, a number is assigned for each area corresponding to each of the showcase areas on the display unit 120 so that a predetermined position on the display unit 120 can be selected using the button to which same number is assigned.

A process of selecting the product can be preformed by the portable terminal of the user. For example, it is possible to constitute so that an interface for operating the sales supporting apparatus 10 is provided when the user opens a predetermined web site, or an interface screen automatically opens when the user comes close to the sales supporting apparatus 10.

Although it is explained that the clothes are sold by the sales supporting apparatus, a product to be sold by the sales supporting apparatus can be a wearable product, portable goods, and goods such as furniture or an electrical appliance used in a house. The wearable product can be a garment, a hat, shoes, glasses, an accessory such as a necklace or a watch, sports goods such as a helmet or protector, or the like. The portable goods can be a bag, an umbrella, sports goods such as a club or a racket, or the like. The goods used in the house can be a desk, a chair, a sofa, a book shelf, interior product, a television, a refrigerator, other electrical appliances, or the like. The matching function is particularly effective for people who play sports as a fashion because a visual image whether a wear matches goods is important for such people.

It is still possible to input data (computer graphics, plan view, or the like) of the entirety or a portion of a house of the user in the sales supporting apparatus 10, so that the data is combined with product data such as furniture, and the mirror image of the user is reflected on the combined image so that the user can check an atmosphere of a state if the user purchases the product.

The information to be displayed on the display unit 120 is not limited to the product information directly related to the product and can be other detailed attribute information such as a current sales ranking or a material.

As described above, according to an aspect of the present invention, a real product can be viewed through a display unit, related information on the product can be additionally displayed on the display unit, and the product and the related information can easily be presented to a user by alternately displaying the information about the real product and the virtually-created related information on the product. Accordingly, it is possible for the user to carefully consider the product and to purchase the product after determining whether the product is suitable for the user. It is also advantageous for a shop to enable the user to carefully check the product like in the shop even when the shop is closed, and to perform a process for the purchase, the reservation, or the holding for the product.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for supporting sales of a product, comprising:
   a showcase unit for displaying the product;
   a transmissive display unit that displays thereon product information on the product displayed in the showcase unit and that enables the displayed product to be viewed therethrough when no product information is displayed thereon;
   a control unit that controls a display of the product information on the transmissive display unit and a sales processing of the product, with an interactive function;
   a memory unit that stores therein the product information; and
   an operating unit that inputs instruction information to the control unit.

2. The apparatus according to claim 1, wherein the product information is one of either still image information or moving image information indicating a variation in color, shape, and size of the product.

3. The apparatus according to claim 1, wherein the product information is one of either still image information or moving image information indicating an appearance of the product viewed from a second direction that is different from a first direction displayed in the showcase unit.

4. The apparatus according to claim 3, wherein the second direction can be changed to an arbitrary direction.

5. The apparatus according to claim 1, wherein the product information is superimposed on image information indicating body information of a user.

6. The apparatus according to claim 5, further comprising a half mirror arranged between the showcase unit and the transmissive display unit, wherein
   the image information indicating the body information of the user is a mirror image of the user reflected on the half mirror.

7. The apparatus according to claim 1, further comprising an information communication unit that acquires image information of an other product that belongs to the user and that relates to the product from outside, wherein
   the image information of the other product is superimposed on the product information.

8. The apparatus according to claim 1, wherein
   the product is attached with a radio-frequency identification,
   the showcase unit is attached with a radio-frequency identification reader, and
   the radio-frequency identification reader reads data of the radio-frequency identification attached on the product, to automatically recognize a location of the product in the showcase unit.

9. The apparatus according to claim 1, wherein
   a display size of the product information is variable, and
   the product information is displayed in an actual size.

10. The apparatus according to claim 1, wherein the control unit performs an authentication of the user by acquiring an identification unique to the user, to perform either one of a reservation processing and a holding processing for the product.

11. The apparatus according to claim 1, wherein data about any one of a purchase processing, a reservation processing, and a holding processing for a predetermined product is displayed in an area corresponding to the predetermined product on the transmissive display unit.

* * * * *